US 9,902,456 B2

(12) United States Patent
Mizuta et al.

(10) Patent No.: US 9,902,456 B2
(45) Date of Patent: Feb. 27, 2018

(54) STORAGE PART STRUCTURE OF SADDLE-RIDE-TYPE VEHICLE

(71) Applicant: HONDA MOTOR CO., LTD., Tokyo (JP)

(72) Inventors: Koji Mizuta, Wako (JP); Yukitou Fujimoto, Wako (JP); Daiki Hamaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 142 days.

(21) Appl. No.: 14/961,142

(22) Filed: Dec. 7, 2015

(65) Prior Publication Data
US 2016/0214677 A1    Jul. 28, 2016

(30) Foreign Application Priority Data

Jan. 23, 2015   (JP) .................................. 2015-011548

(51) Int. Cl.
| B62K 19/30 | (2006.01) |
| B62J 9/00 | (2006.01) |
| B62K 19/46 | (2006.01) |
| B62K 11/04 | (2006.01) |

(52) U.S. Cl.
CPC ............. B62K 19/30 (2013.01); B62J 9/008 (2013.01); B62K 11/04 (2013.01); B62K 19/46 (2013.01)

(58) Field of Classification Search
CPC .......... B62K 19/30; B62K 19/46; B62J 9/008; B62J 9/00
See application file for complete search history.

(56) References Cited

U.S. PATENT DOCUMENTS

| 3,937,484 | A | * | 2/1976 | Morioka | ................ | B62K 11/08 |
| | | | | | | 180/219 |
| 4,830,134 | A | * | 5/1989 | Hashimoto | .............. | B62J 35/00 |
| | | | | | | 180/219 |
| 4,940,111 | A | * | 7/1990 | Nogami | ................. | B62K 19/46 |
| | | | | | | 180/219 |
| 5,020,625 | A | | 6/1991 | Yamauchi et al. | | |
| 5,048,634 | A | * | 9/1991 | Shirasagi | ............... | B62K 19/46 |
| | | | | | | 180/219 |

(Continued)

FOREIGN PATENT DOCUMENTS

| EP | 2305549 A1 | 4/2011 |
| JP | 2-70586 A | 3/1990 |

(Continued)

*Primary Examiner* — Jacob D Knutson
*Assistant Examiner* — Michael R Stabley
(74) *Attorney, Agent, or Firm* — Birch, Stewart, Kolasch & Birch, LLP

(57) ABSTRACT

A storage part structure of a saddle-ride-type vehicle with a key cylinder for opening or closing of a box lid with a simple structure. The storage part structure for a saddle-ride-type vehicle includes a head pipe, a main frame extending rearwardly from the head pipe, a storage box arranged in the vicinity of the main frame wherein the storage box opens upwardly. A box lid covers an opening portion of the upwardly openable storage box in an openable and closable manner, wherein a key cylinder for operating a box-side locking mechanism for locking the box lid is arranged behind a handle holder and in front of the storage box. The box lid includes an arm portion positioned on a side of the key cylinder.

18 Claims, 7 Drawing Sheets

(56) References Cited

U.S. PATENT DOCUMENTS

| | | | | |
|---|---|---|---|---|
| 5,127,560 A * | 7/1992 | Miyamoto | ............. | B62K 19/46 224/413 |
| 5,127,561 A * | 7/1992 | Miyamoto | ............. | B62K 19/46 224/413 |
| 5,147,077 A * | 9/1992 | Nakajima | ............. | B62K 19/46 224/413 |
| 5,388,660 A * | 2/1995 | Shirasagi | ............... | B62K 11/00 180/219 |
| 8,662,229 B2 * | 3/2014 | Nakagome | ............... | B62J 35/00 180/218 |
| 8,720,757 B2 * | 5/2014 | Salisbury | .................. | B62J 7/04 224/413 |

FOREIGN PATENT DOCUMENTS

| JP | 2-70587 A | 3/1990 |
|---|---|---|
| JP | 2012-197011 A | 10/2012 |

\* cited by examiner

US 9,902,456 B2

STORAGE PART STRUCTURE OF SADDLE-RIDE-TYPE VEHICLE

CROSS-REFERENCE TO RELATED APPLICATIONS

The present application claims priority under 35 USC 119 to Japanese Patent Application No. 2015-011548 filed Jan. 23, 2015 the entire contents of which are hereby incorporated by reference.

BACKGROUND OF THE INVENTION

1. Field of the Invention

The present invention relates to a storage part structure of a saddle-ride-type vehicle.

2. Description of Background Art

A storage part structure of a saddle-ride-type vehicle is known that includes a pair of left and right main frames which extend rearward from a head pipe with a storage box arranged between the left and right main frames in a state wherein the storage box opens upward. A box lid covers an opening portion of the storage box in an openable and closable manner. A key cylinder operates the opening/closing of the box lid and is arranged in front of a front end of the box lid in a closed state. See, for example, JP-A-2012-197011.

However, in the above-mentioned conventional storage part structure for a saddle-ride-type vehicle, the key cylinder is positioned on a front side of the vehicle. Thus, favorable operability of the key cylinder is acquired. However, a front end of the box lid is arranged excessively close to an occupant's body side and the opening or closing of the box lid becomes difficult. In the saddle-ride-type vehicle, a space for arranging parts is limited. Thus, there is a demand for the improvement of the operability of the key cylinder and the operability of opening or closing of the box lid with a simple structure.

SUMMARY AND OBJECTS OF THE INVENTION

The present invention has been made in view of the above-mentioned circumstances. It is an object of an embodiment of the present invention to provide a storage part structure for a saddle-ride-type vehicle which can improve the operability of the key cylinder and the operability of the opening or closing of the box lid with a simple structure.

According to an embodiment of the present invention, a storage part structure of a saddle-ride-type vehicle includes a head pipe (14); a main frame (15) which extends rearwardly from the head pipe (14); a storage box (51) which is arranged in the vicinity of the main frame (15) in a state where the storage box (51) opens upwardly; and a box lid (52) which covers an opening portion (51a) of the upwardly openable storage box (51) in an openable and closable manner. A key cylinder (107) operates a box-side locking mechanism (102) for locking the box lid (52) and is arranged behind a handle holder (25) and in front of the storage box (51). The box lid (52) includes an arm portion (140) positioned on a side of the key cylinder (107).

According to an embodiment of the present invention, in the saddle-ride-type vehicle, the key cylinder that operates the box-side locking mechanism for locking the box lid is arranged behind the handle holder and in front of the storage box. The box lid includes the arm portion positioned on a side of the key cylinder. Due to such a configuration, an occupant can operate the key cylinder which is positioned behind the handle holder and in front of the storage box and not being positioned excessively close to the occupant. Thus, the occupant can easily operate the key cylinder and, at the same time, can easily perform an opening or closing operation of the box lid by grasping the arm portion of the box lid arranged on a side of the key cylinder and not being positioned excessively close to the occupant. Accordingly, operability of the key cylinder and operability of opening or closing of the box lid can be enhanced with a simple structure.

According to an embodiment of the present invention, the box lid (52) includes a lower-side box lid (115); and an upper-side box lid (116) that covers the lower-side box lid (115) from above, wherein the arm portion (140) is formed on the upper-side box lid (116).

According to an embodiment of the present invention, the box lid includes the lower-side box lid; and the upper-side box lid which covers the lower-side box lid from above, and the arm portion is formed on the upper-side box lid. Accordingly, the degree of freedom in setting the shape of the upper-side box lid can be increased. Thus, the arm portion can be easily formed.

According to an embodiment of the present invention, a recessed portion (135, 125) is formed in at least one of the upper-side box lid (116) and the lower-side box lid (115) thus forming a bag mounting hole (136).

According to the invention, the recessed portion is formed in at least one of the upper-side box lid and the lower-side box lid thus forming the bag mounting hole. Thus, a bag can be easily mounted on the box lid without providing a dedicated part or the like for mounting the bag.

According to an embodiment of the present invention, the bag mounting hole (136) is formed so as to allow air to flow toward an inside in a vehicle width direction from an outside in a vehicle width direction and rearwardly.

According to an embodiment of the present invention, the bag mounting hole is formed so as to allow air to flow toward an inside in a vehicle width direction from an outside in a vehicle width direction and rearwardly. Thus, even in the configuration where a height of the box lid becomes high due to the provision of the upper-side box lid, it is possible to make a air efficiently flow rearward whereby the vehicle can ensure an operational performance.

According to an embodiment of the present invention, the upper-side box lid (116) is formed into an approximately H-shape as viewed in a plan view by including a pair of left and right rear extending portions (134) that extends rearward. The bag mounting hole (136) is formed on a side of the upper-side box lid (116) where the pair of left and right rear extending portions (134) is provided.

According to an embodiment of the present invention, the bag mounting hole is formed on a side of the upper-side box lid (116) having an approximate H shape as viewed in a plan view where the pair of left and right rear extending portions is provided. Accordingly, a bag can be supported by the pair of left and right rear extending portions provided to a rear portion the upper-side box lid (116) having an approximate H shape at positions close to the outside in a vehicle width direction. Thus, the bag can be supported firmly and, at the same time, the upper-side box lid can be made lightweight.

According to an embodiment of the present invention, a bent portion (132) where the upper-side box lid (116) is bent in a longitudinal direction of the vehicle is formed on the upper-side box lid (116), the bag mounting hole (136) is formed in the upper-side box lid (116) behind the bent portion (132), and the arm portion (140) is formed on the upper-side box lid (116) in front of the bent portion (132).

According to an embodiment of the present invention, the bent portion where the upper-side box lid is bent in a longitudinal direction of the vehicle is formed on the upper-side box lid, the bag mounting hole is formed in the upper-side box lid behind the bent portion, and the arm portion is formed on the upper-side box lid in front of the bent portion. Accordingly, the external appearance of the upper-side box lid at the time of not mounting the bag can be enhanced by the bent portion, and the bag can ensure a large capacity when the bag is mounted. Further, a distance can be ensured between the bag and the arm portion. Thus, the bag minimally becomes an obstacle whereby the operability of the arm portion can be enhanced.

According to an embodiment of the present invention, a bent portion (132) where the upper-side box lid (116) is bent in a longitudinal direction of the vehicle is formed on the upper-side box lid (116), and the upper-side box lid (116) has a flat portion (131) which is formed approximately flat at the center in a vehicle width direction at a position in front of the bent portion (132) and behind the key cylinder (107).

According to an embodiment of the present invention, the upper-side box lid has the flat portion formed approximately flat at the center in a vehicle width direction at the position in front of the bent portion and behind the key cylinder. Accordingly, a smartphone or the like can be arranged on the flat portion formed approximately flat at the center in a vehicle width direction.

The storage part structure of a saddle-ride-type vehicle according to an embodiment of the present invention can improve operability of the key cylinder and operability of opening or closing of the box lid with the simple structure.

The storage part structure can easily form the arm portion on the upper-side box lid.

The storage part structure can easily mount a bag on the box lid.

Even in the configuration where a height of the box lid becomes high due to the provision of the upper-side box lid, it is possible to make air efficiently flow rearwardly whereby the vehicle can ensure an operational performance.

A bag can be supported at a position close to the outside in a vehicle width direction by the rear extending portions. Thus, the bag can be supported firmly and, at the same time, the upper-side box lid can be made lightweight.

The external appearance of the upper-side box lid at the time of not mounting the bag can be enhanced by the bent portion, and the bag can ensure a large capacity when the bag is mounted. Further, the operability of the arm portion can be enhanced even when the bag is mounted.

Further, a smartphone or the like can be arranged on the flat portion of the upper-side box lid.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the invention is described with reference to the drawings. In the description, directions of "front," "rear," "left," "right," "up" and "down" are equal to the directions of a vehicle body unless otherwise specified. In the respective drawings, symbol FR indicates a front side of the vehicle body, symbol UP indicates an upper side of the vehicle body, and symbol LH indicates a left side of the vehicle body.

Figure 1:
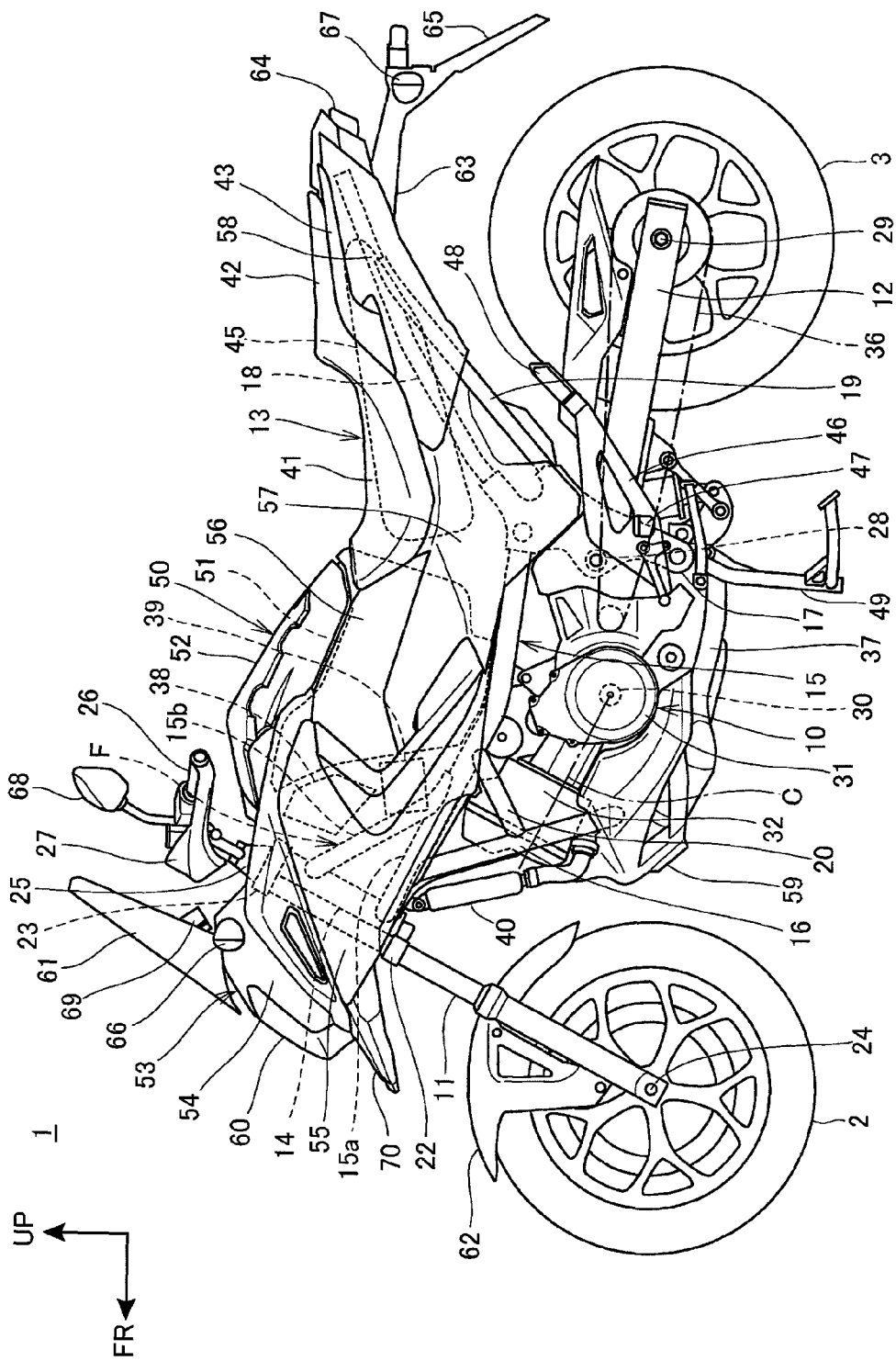
FIG. 1 is a left side view of a motorcycle according to an embodiment of the invention.

FIG. 1 is a left side view of a motorcycle according to an embodiment of the invention. In FIG. 1, with respect to each pair of left and right parts, only a left part is illustrated.

The motorcycle 1 is a vehicle wherein an engine 10 which forms a power unit is supported on a vehicle body frame F with a pair of left and right front forks 11, 11 supports a front wheel 2 on a front end of the vehicle body frame F in a steerable manner. A swing arm 12 supports a rear wheel 3 and is mounted on a rear portion side of the vehicle body frame F. The motorcycle 1 is a saddle-ride-type vehicle where a seat 13 on which an occupant sits in a straddling manner is arranged above a rear portion of the vehicle body frame F.

The vehicle body frame F includes a head pipe 14 which is mounted on a front end of the vehicle body frame F; a pair of left and right main frames 15, 15 which extends rearwardly and downwardly from a lower portion of the head pipe 14; a pair of left and right down frames 16, 16 which extends rearwardly and downwardly from front end portions of the main frames 15, 15; a pair of left and right pivot frames 17, 17 which extends downwardly from rear ends of the main frames 15, 15; a pair of left and right seat frames 18, 18 which extends rearwardly and upwardly to a rear end portion of the vehicle from upper ends of the pivot frames 17, 17; and a pair of left and right sub frames 19, 19 which extends rearwardly and upwardly from upper portions of the pivot frames 17, 17 and is connected to rear portions of the seat frames 18, 18.

Each main frame 15 has a main frame body portion 15a which extends rearwardly and downwardly from a lower portion of the head pipe 14 with a relatively gentle inclination and a reinforcing frame portion 15b which connects an upper portion of the head pipe 14 and an intermediate portion of the main frame body portion 15a to each other. The vehicle body frame F also includes a pair of left and right connecting frames 20, 20 which connects the intermediate portions of the main frame body portions 15a, 15a and the down frames 16, 16 to each other.

A steering shaft (not shown in the drawing) is rotatably and pivotally supported on the head pipe 14, and a bottom bridge 22 and a top bridge 23 which extend in the vehicle width direction are fixed to a lower end portion and an upper end portion of the steering shaft respectively. The front forks 11, 11 are supported on the bottom bridge 22 and the top bridge 23, and the front wheel 2 is pivotally supported on a front wheel axle 24 which is mounted on lower ends of the front forks 11, 11. The top bridge 23 has a handle holder 25 which extends upwardly from an upper surface of the top bridge 23. A handle bar 26 for steering extends in the vehicle width direction and is supported on the handle holder 25. Knuckle guards 27, 27 are mounted on the handle bar 26.

The swing arm 12 has a front end portion thereof pivotally supported on a pivot shaft 28 which connects the left and right pivot frames 17, 17 to each other. Thus, the swing arm 12 is swingable in the vertical direction about the pivot shaft 28. The rear wheel 3 is pivotally supported on a rear wheel axle 29 which penetrates a rear end portion of the swing arm 12.

A rear suspension (not shown in the drawing) is disposed between the swing arm 12 and the vehicle body frame F.

The engine 10 includes a crankcase 31 which supports a crankshaft 30 extending in the vehicle width direction and a cylinder portion 32 which extends frontwardly and upwardly from a front side of a front portion of the crankcase 31.

The engine 10 is an engine of a type where a cylinder axis C of the cylinder portion 32 is arranged in a frontwardly inclined manner such that the cylinder axis C is closer to the horizontal direction than the vertical direction. A space for arranging parts is secured above the engine 10.

An output of the engine 10 is transmitted to the rear wheel 3 through a chain 36 provided between an output shaft (not shown in the drawing) of the engine 10 and the rear wheel 3.

An exhaust pipe 37 of the engine 10 is pulled out downwardly from a cylinder head of the cylinder portion 32, extends rearwardly after passing through an area below the engine 10, and is connected to a muffler (not shown in the drawing).

An air cleaner box 38 which purifies air supplied to the engine 10 is arranged above front portions of the main frames 15, 15 and behind the head pipe 14. Air which passes through the air cleaner box 38 flows into the cylinder head of the cylinder portion 32 after a flow rate is adjusted by a throttle body (not shown in the drawing). A battery 39 is arranged between the air cleaner box 38 and the main frame body portions 15a, 15a. A radiator 40 of the engine 10 is arranged below the head pipe 14 and in front of the cylinder portion 32.

The seat 13 includes a front seat 41 for a rider and a rear seat 42 for a pillion passenger which is one step higher than the front seat 41. The front seat 41 is arranged above the pivot frames 17, 17 and the front portions of the seat frames 18, 18, and the rear seat 42 is arranged above the seat frames 18, 18. Grips 43, 43 which the pillion passenger seated on the rear seat 42 grips are disposed on left and right sides of the rear seat 42 respectively.

A fuel tank 45 is arranged between the front seat 41, the rear seat 42, and the seat frames 18, 18.

A pair of left and right step holders 46, 46 is arranged on outer sides of the pivot frames 17, 17 respectively with steps 47, 47 for a rider being fixed to front portions of the respective step holders 46. Tandem steps 48, 48 for a pillion passenger are fixed to rear portions of the respective step holders 46.

A main stand 49 is connected to lower portions of the pivot frames 17, 17.

A storage part 50 is provided above rear portions of the main frames 15, 15 and between the front seat 41 and the head pipe 14. The storage part 50 includes a storage box 51 which has an upper surface thereof opened and a box lid 52 which closes an opening formed on the upper surface of the storage box 51 in an openable and closeable manner.

The storage part 50 has enough capacity to store one full face type helmet. The air cleaner box 38 and the battery 39 are arranged between the storage box 51 and the head pipe 14.

The motorcycle 1 includes a resin-made vehicle body cover 53 for covering the vehicle body. The vehicle body cover 53 includes a front cowl 54 positioned in front of the head pipe 14; a pair of left and right side covers 55, 55 for covering the head pipe 14 and the front portions of the main frames 15, 15 from sides; a pair of left and right box side covers 56, 56 arranged between the side covers 55, 55 and the front seat 41 for covering an upper portion of the storage box 51 from the sides; a pair of left and right middle covers 57, 57 disposed above the main frames 15, 15 for covering a lower portion of the storage box 51 and a lower portion of the front seat 41; a rear cowl 58 disposed below the rear seat 42 for covering the seat frames 18, 18 and the sub frames 19, 19; an under cover 59 for covering the engine 10 from below; and a beak-shaped cowl 70 projecting frontward and downward in a beak shape from a lower side of the front cowl 54. The beak-shaped cowl 70 has a shape tapered toward a distal end side thereof in the vertical direction as well as in the vehicle width direction. The box side covers 56, 56 are also portions which a rider (occupant) grips by his knees.

The headlight 60 is integrally mounted on a center portion of the front cowl 54 in the vehicle width direction. The beak-shaped cowl 70 projects frontward from the headlight 60.

A wind screen 61 is mounted on an upper portion of the front cowl 54. A front fender 62 is fixed to the front forks 11, 11.

A rear fender 63 is arranged above the rear wheel 3, and covers the fuel tank 45 from below. A tail lamp 64 is mounted on a rear end portion of the rear cowl 58 above a rear end portion of the rear fender 63. A license plate holder 65 is fixed to a rear end of the rear fender 63.

Front blinkers 66, 66 are fixed to the front cowl 54, and rear blinkers 67, 67 are fixed to the rear fender 63. Rear mirrors 68, 68 are fixed to the handle bar 26. Meters 69 for displaying a speed and the like are arranged behind the wind screen 61 and above the front cowl 54.

Figure 2:
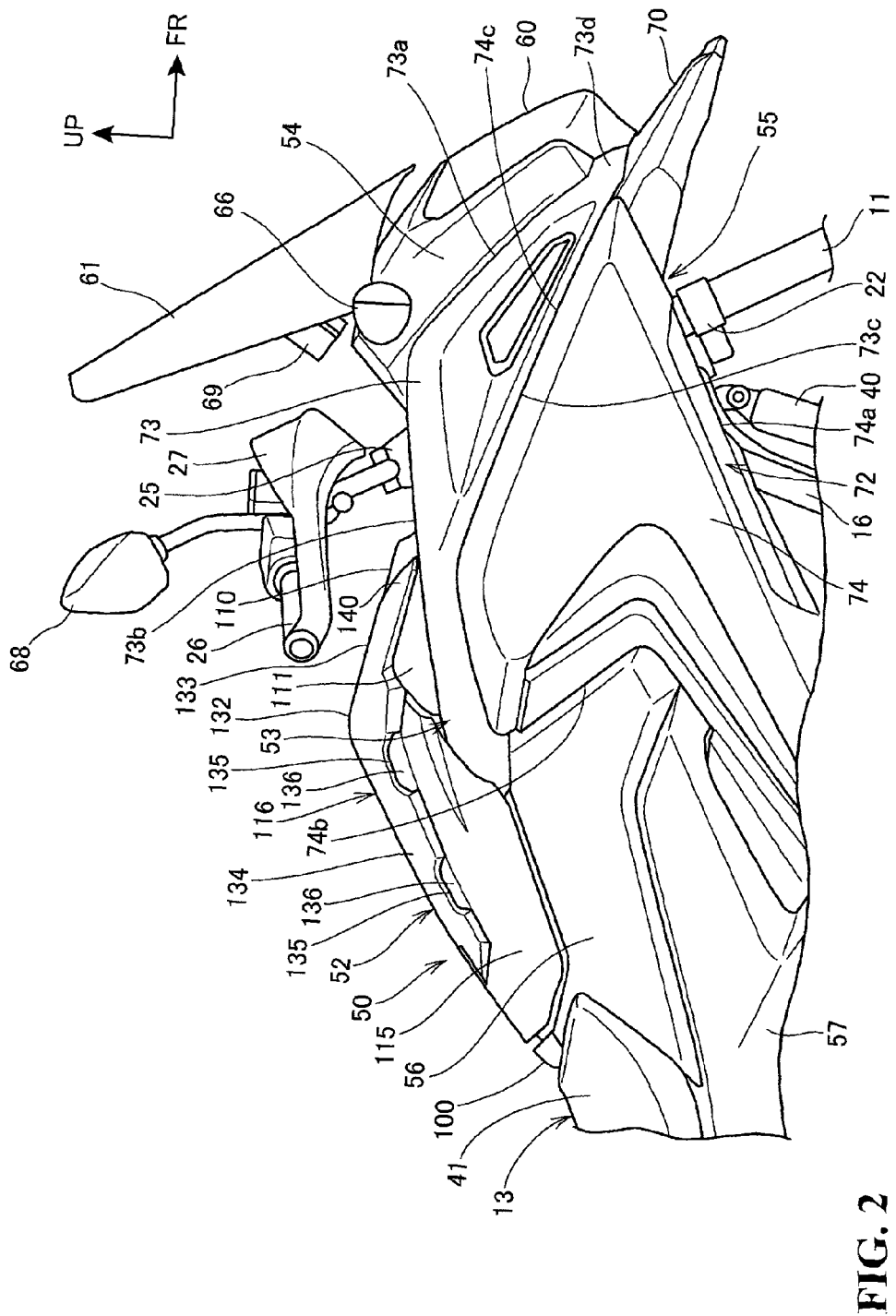
FIG. 2 is a right side view of a front portion of the motorcycle.

FIG. 2 is a right side view of a front portion of the motorcycle 1. The side covers 55, 55 are configured substantially symmetrically in the lateral direction. Thus, the right side cover 55 is explained in this embodiment.

The side cover 55 includes a plate-shaped base side cover (not shown in the drawing) which is mounted on a vehicle body frame F side; and an outer side cover 72 which is mounted on an outer side surface of the base side cover.

The outer side cover 72 includes an upper outer side cover 73 which is contiguously formed with a rear edge portion of the front cowl 54; and a lower outer side cover 74 which extends downwardly contiguously from the upper outer side cover 73.

The upper outer side cover 73 is formed into an elongated plate shape in the longitudinal direction rather than in the vertical direction. The upper outer side cover 73 includes a front upper edge 73a extending rearwardly and upwardly along a rear edge portion of the front cowl 54; a rear upper edge 73b extending rearwardly and downwardly after being bent at a portion thereof in the vicinity of a rear end of the front cowl 54; and a lower edge 73c extending rearwardly along the front upper edge 73a and the rear upper edge 73b. A front edge 73d of the upper outer side cover 73 is positioned between a front end portion of the front cowl 54 and an upper surface of a rear end portion of the beak-shaped cowl 70. A rear end of the upper outer side cover 73 is positioned in the vicinity of an intermediate portion of the box lid 52 in the longitudinal direction.

The upper outer side cover 73 has a front portion thereof positioned in front of the head pipe 14 (FIG. 1) and has a rear portion thereof overlapping with the upper portion of the head pipe 14 as viewed in a side view.

The lower outer side cover 74 extends downward contiguously from the lower edge 73c of the upper outer side cover 73, and as illustrated in FIG. 1, covers the head pipe 14, the front portions of the main frames 15, 15, the air cleaner box 38, and the battery 39. A lower edge 74a of the lower outer side cover 74 extends rearwardly and downwardly along the main frame body portion 15a, and a rear edge 74b of the lower outer side cover 74 is contiguously formed with a front edge of the box side cover 56 and a front edge of the middle cover 57.

Figure 3:
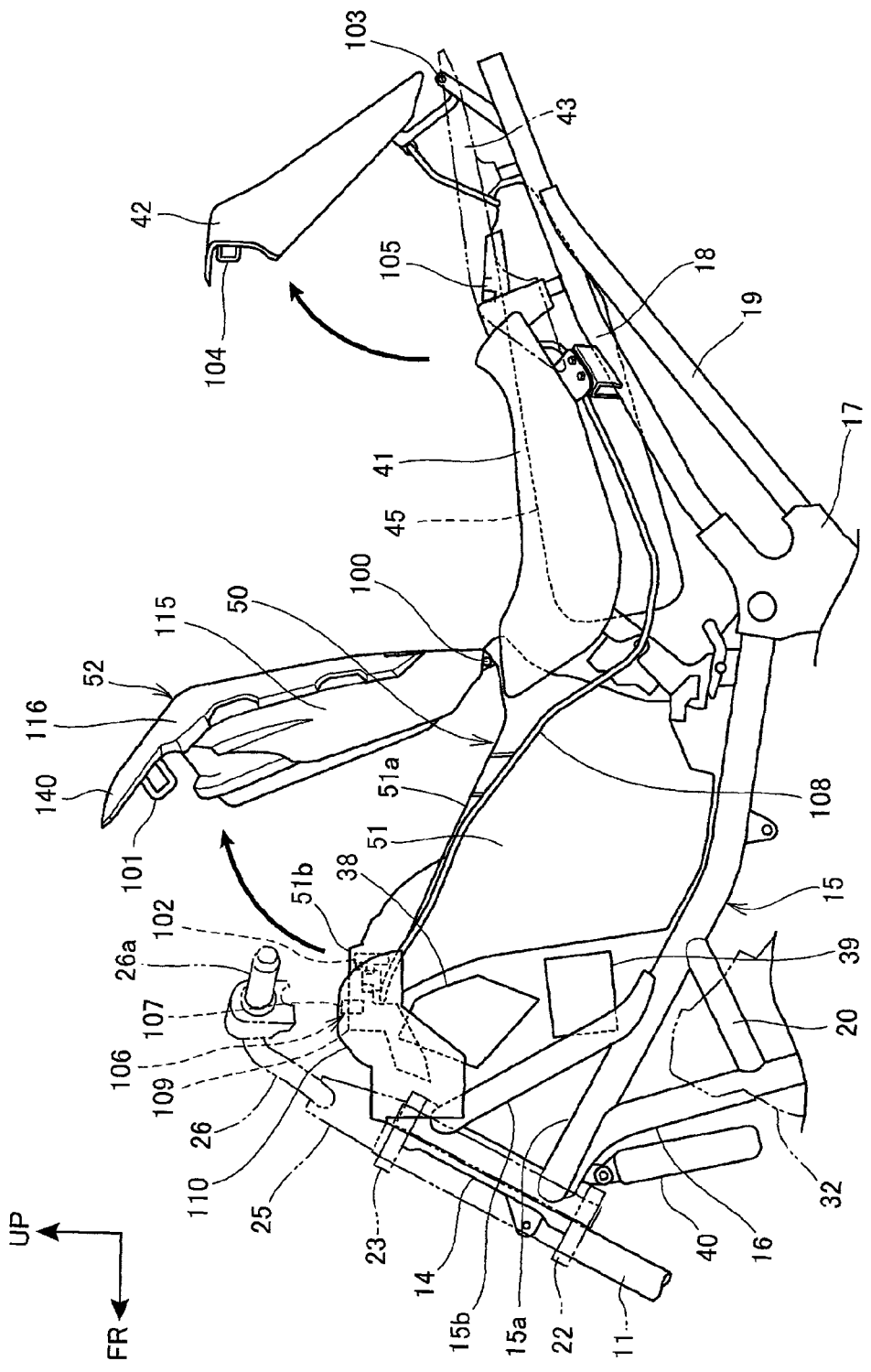
FIG. 3 is a left side view of an upper portion of the motorcycle in a state where most of a vehicle body cover is removed.

FIG. 3 is a left side view of the upper portion of the motorcycle 1 in a state where most of the vehicle body cover 53 is removed.

The storage box 51 includes a hinge mechanism 100 connected to a rear end portion of the box lid 52 on an upper rear end portion thereof. The box lid 52 includes a locking member 101 projecting downwardly on a front end portion thereof. The box lid 52 is maintained in a closed state as the locking member 101 is engaged with and locked to a box-side locking mechanism 102 which is mounted on a front side of the storage box 51. The box lid 52 is opened by being rotated rearwardly about the hinge mechanism 100, and the opening portion 51a on the upper surface of the storage box 51 is exposed upwardly when the box lid 52 is opened.

The box-side locking mechanism 102 is mounted on a projecting portion 51b projecting upwardly from a front upper portion of the storage box 51.

The rear seat 42 is connected to a rear end portion of the vehicle body frame F by way of the seat-side hinge mechanism 103 mounted on a rear end portion of the rear seat 42. The rear seat 42 includes a locking member 104 projecting downwardly on a front end portion of the rear seat 42. The rear seat 42 is maintained in a closed state as the locking member 104 is engaged with and locked to a seat-side locking mechanism 105 mounted behind the front seat 41. The rear seat 42 is opened by being rotated rearwardly about the seat-side hinge mechanism 103, and a fuel supply port (not shown in the drawing) of the fuel tank 45 is exposed upwardly when the rear seat 42 is opened.

The motorcycle 1 includes an unlocking mechanism 106 for releasing (unlocking) a locking state by operating the box-side locking mechanism 102 and the seat-side locking mechanism 105. The unlocking mechanism 106 includes a key cylinder 107 which is rotationally operated by a key (not shown in the drawing) inserted into the key cylinder 107; a box-lid-use cable (not shown in the drawing) for connecting the key cylinder 107 and the box-side locking mechanism 102 to each other; and a seat-use cable 108 for connecting the key cylinder 107 and the seat-side locking mechanism 105 to each other.

When the key cylinder 107 is at a rotationally neutral position, the above-mentioned key can be inserted into and removed from the key cylinder 107, and the box-side locking mechanism 102 and the seat-side locking mechanism 105 are locked.

When the key cylinder 107 is rotationally operated in one direction from the neutral position using the key, only the above-mentioned box-lid-use cable is operated, and the box-side locking mechanism 102 is unlocked so that the box lid 52 is brought into an openable state.

When the key cylinder 107 is rotationally operated in the other direction from the neutral position using the key, only the seat-use cable 108 is operated, and the seat-side locking mechanism 105 is unlocked so that the rear seat 42 is brought into an openable state.

A main key for turning on and off a main power source of the motorcycle 1 can be used. However, the above-mentioned key may be a key different from the main key.

A key cylinder stay 109 for supporting the key cylinder 107 is disposed between a front end of the box lid 52 in a closed state and the handle holder 25.

A front top cover 110 for covering the key cylinder stay 109 and the air cleaner box 38 from above is disposed between the front end of the box lid 52 in a closed state and the handle holder 25. The key cylinder stay 109 is supported on the front top cover 110.

Figure 4:
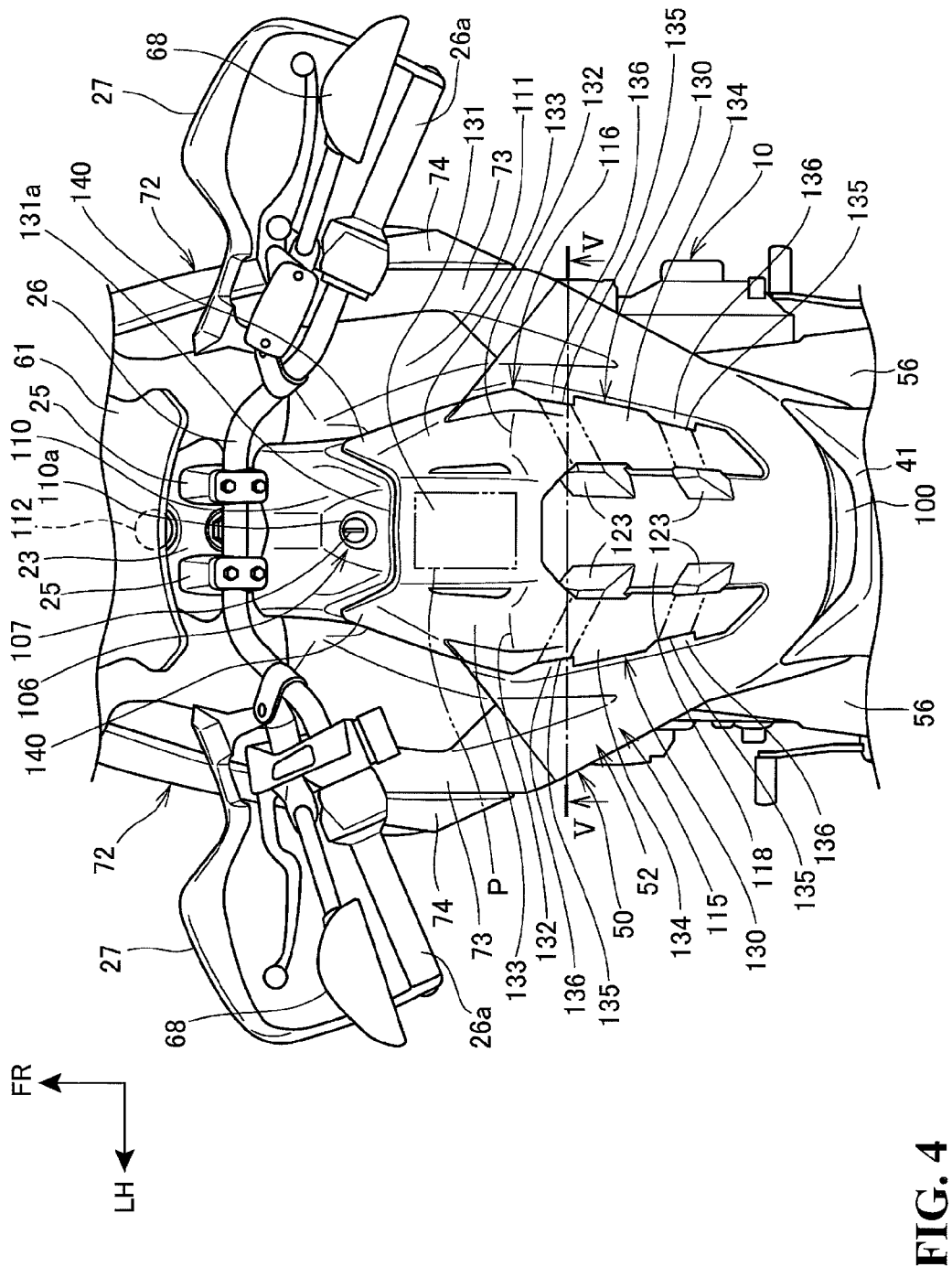
FIG. 4 is a plan view of a box lid and the periphery of the box lid as viewed from above.

FIG. 4 is a plan view of the box lid 52 and the periphery of the box lid 52 as viewed from above.

The front top cover 110 has an upper surface opening 110a (FIG. 4) at the center thereof in the vehicle width direction. A key insertion port of the key cylinder 107 is exposed upwardly through the upper surface opening 110a.

The key cylinder 107 is arranged between the handle holders 25 and a front edge of the box lid 52 in the longitudinal direction. Such a position of the key cylinder 107 is substantially equal to the positions of the grip portions 26a, 26a on left and right ends of the handle bar 26 which a rider grips in the longitudinal direction, and is the position where the rider seated on the front seat 41 can easily extend his hand to the key cylinder 107 without taking an unusual posture. Accordingly, the rider can easily operate the key cylinder 107.

Front top side covers 111 for covering areas between the front top cover 110 and the left and right upper outer side covers 73, 73 respectively are arranged outside the front top cover 110 in the vehicle width direction.

A main key cylinder 112 into which the main key is inserted is arranged in front of the top bridge 23.

Figure 5:
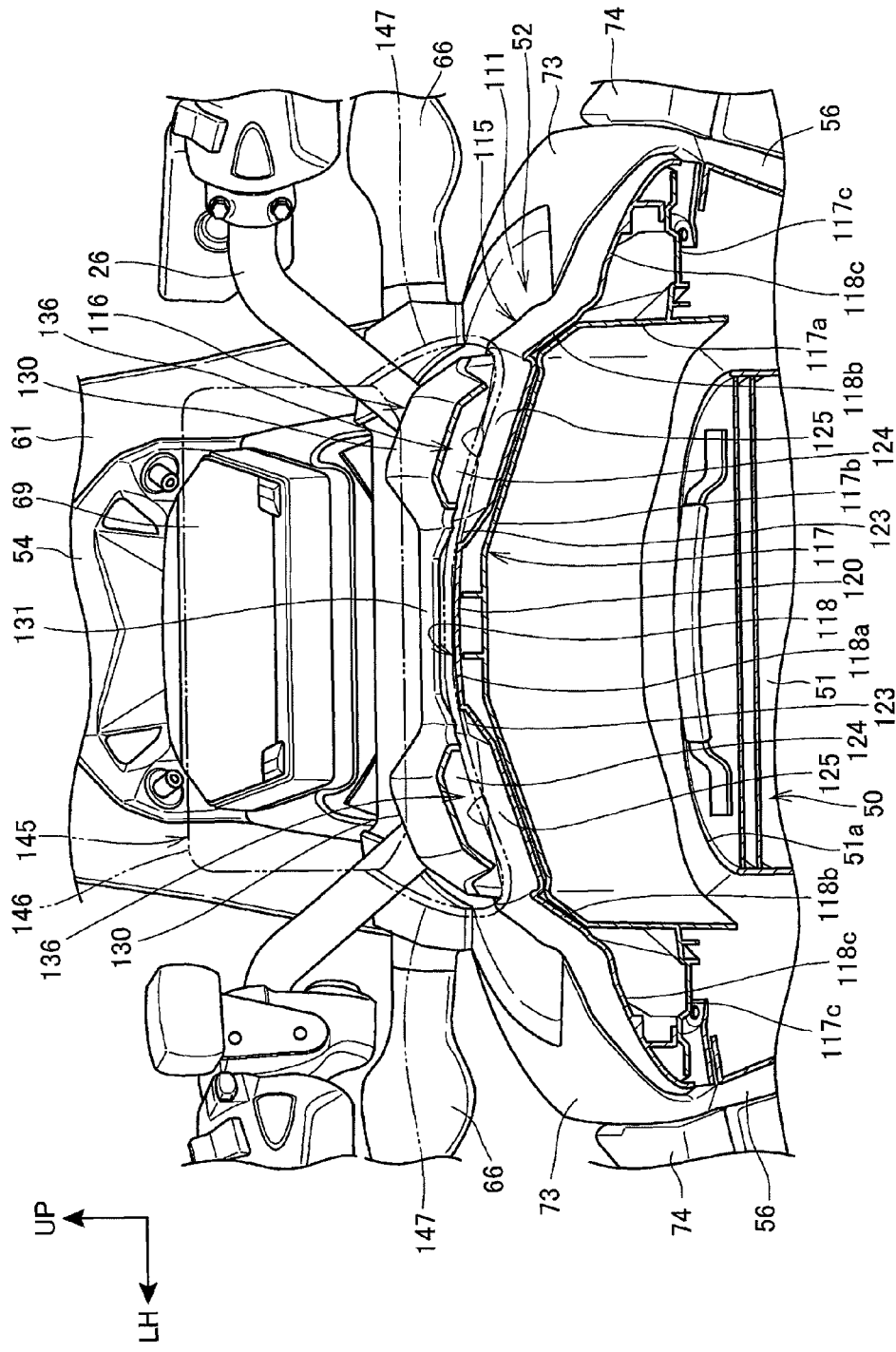
FIG. 5 is a cross-sectional view taken along a line V-V in FIG. 4.

FIG. 5 is a cross-sectional view taken along a line V-V in FIG. 4.

As shown in FIG. 4 and FIG. 5, the box lid 52 includes a lower-side box lid 115 for covering the opening portion 51a of the storage box 51; and a plate-like upper-side box lid 116 for covering the lower-side box lid 115 from above.

The lower-side box lid 115 includes a lid base 117 which is brought into contact with an upper edge portion of the storage box 51 and directly covers the opening portion 51a; and a lid cover 118 which is mounted on an upper surface of the lid base 117. The hinge mechanism 100 is mounted on a rear end portion of the lid base 117.

Figure 6:
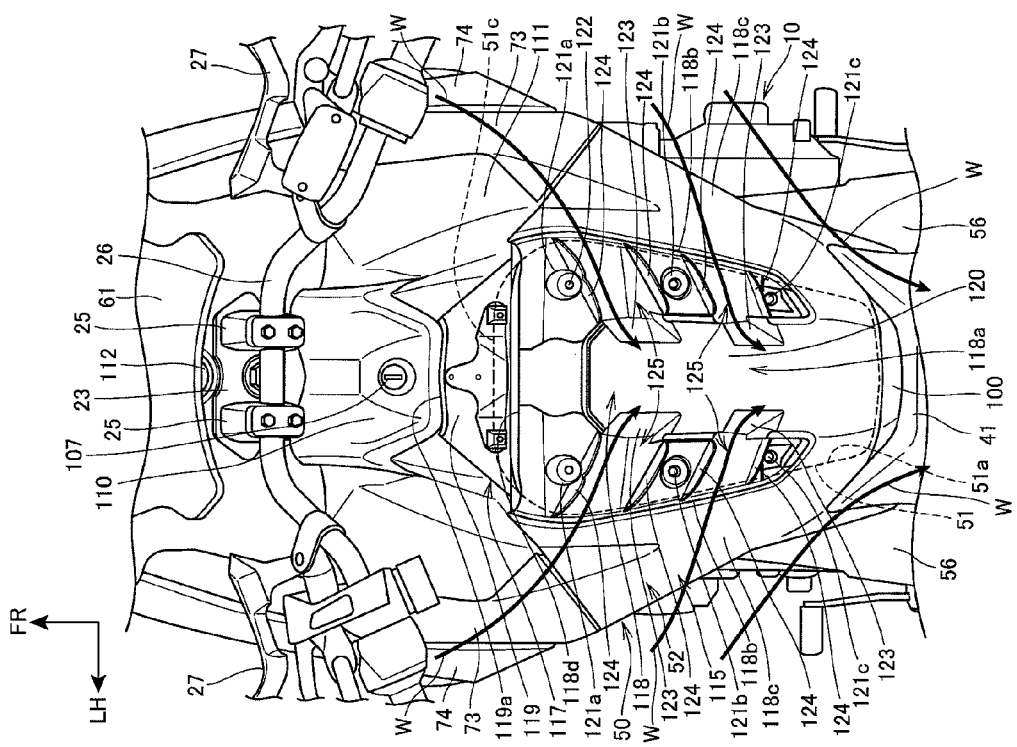
FIG. 6 is a plan view of the box lid with the peripheral portion of the box lid as viewed from above in a state where an upper-side box lid is removed.

FIG. 6 is a plan view of the box lid 52 and the periphery of the box lid 52 as viewed from above in a state where the upper-side box lid 116 is removed.

As shown in FIG. 4 to FIG. 6, the lid base 117 includes a frame-shaped peripheral wall portion 117a extending upwardly along the upper edge portion of the opening portion 51a of the storage box 51; an upper wall portion 117b which closes an upper surface of the peripheral wall portion 117a; and support wall portions 117c, 117c which extend outwardly in the vehicle width direction from intermediate portions of the peripheral wall portion 117a in the vertical direction. A space formed inside the lid base 117 is also used as a storage space.

The upper wall portion 117b of the lid base 117 includes a frontwardly extending portion 119 (FIG. 6) which extends to the front from a front edge 118d of the lid cover 118 and the front edge 51c of the opening portion 51a of the storage box 51, and a front edge 119a of the frontwardly extending portion 119 is contiguously formed with an upper rear edge of the front top cover 110. The locking member 101 (FIG. 3) is mounted on a lower surface of the frontwardly extending portion 119.

The lid cover 118 has a bent shape projecting upwardly in cross section in the longitudinal direction, and is formed such that a height of the lid cover 118 is gradually decreased from a center portion to an outer side in the vehicle width direction.

The lid cover 118 includes an upper surface cover portion 118a for covering the upper wall portion 117b of the lid base 117; stepped portions 118b, 118b which extend downwardly by being bent from left and right side edges of the upper surface cover portion 118a; and side cover portions 118c, 118c which extend outwardly in the vehicle width direction by being bent from lower edges of the stepped portions 118b, 118b.

The side cover portions 118c, 118c are supported on the support wall portions 117c, 117c of the lid base 117. Outer edges of the side cover portions 118c, 118c are contiguously formed with upper edges of the box side covers 56, 56.

The upper surface cover portion 118a of the lid cover 118 is a portion on which the upper-side box lid 116 is mounted.

The upper surface cover portion 118a includes a ridge portion 120 which projects upwardly on a center portion thereof in the vehicle width direction. The ridge portion 120 extends from a rear portion to a front portion of the upper surface cover portion 118a.

A plurality of lid fixing portions to which the upper-side box lid 116 is fixed are formed on left and right sides of the ridge portion 120 on an upper surface of the upper surface cover portion 118a. To be more specific, the lid fixing portions include a pair of front lid fixing portions 121a, 121a formed on left and right sides of a front portion of the ridge portion 120; a pair of intermediate lid fixing portions 121b, 121b formed on left and right sides of an intermediate portion of the ridge portion 120 in the longitudinal direction; and a pair of rear lid fixing portions 121c, 121c formed on left and right sides of a rear portion of the ridge portion 120.

Bolts 122 (symbol indicating the bolt at only one portion) are fastened to a lower surface of the upper-side box lid 116 penetrate the front lid fixing portions 121a, 121a, the intermediate lid fixing portions 121b, 121b, and the rear lid fixing portions 121c, 121c respectively from the back surface side of the respective fixing portions. Accordingly, the bolts 122 are not visually recognized from the outside thus enhancing the external appearance of the motorcycle 1.

On respective side portions of the ridge portion 120, a side recessed portion 123 formed by indenting a side portion of the ridge portion 120 inward in the vehicle width direction is formed at a position between the front lid fixing portion 121a and the intermediate lid fixing portion 121b as well as at a position between the intermediate lid fixing portion 121b and the rear lid fixing portion 121c, respectively.

A plurality of ribs 124 are formed on the upper surface of the upper surface cover 118a in such a manner that the ribs 124 are contiguously with front ends and rear ends of the side recessed portions 123 and extend outwardly in the vehicle width direction toward areas in the vicinity of the stepped portions 118b.

Due to the formation of each side recessed portion 123 and a pair of ribs 124, 124 which is contiguously formed with the side recessed portion 123, a lower recessed portion 125 which appears to be downwardly indented as viewed in a side view is formed on an upper surface of the upper surface cover portion 118a at four positions. Each lower recessed portion 125 (recessed portion) is arranged so as to be inclined such that the lower recessed portion 125 is directed inward in the vehicle width direction and rearwardly with an outer end of the lower recessed portion 125 in the vehicle width direction set as a proximal end as viewed in a plan view.

Figure 7:
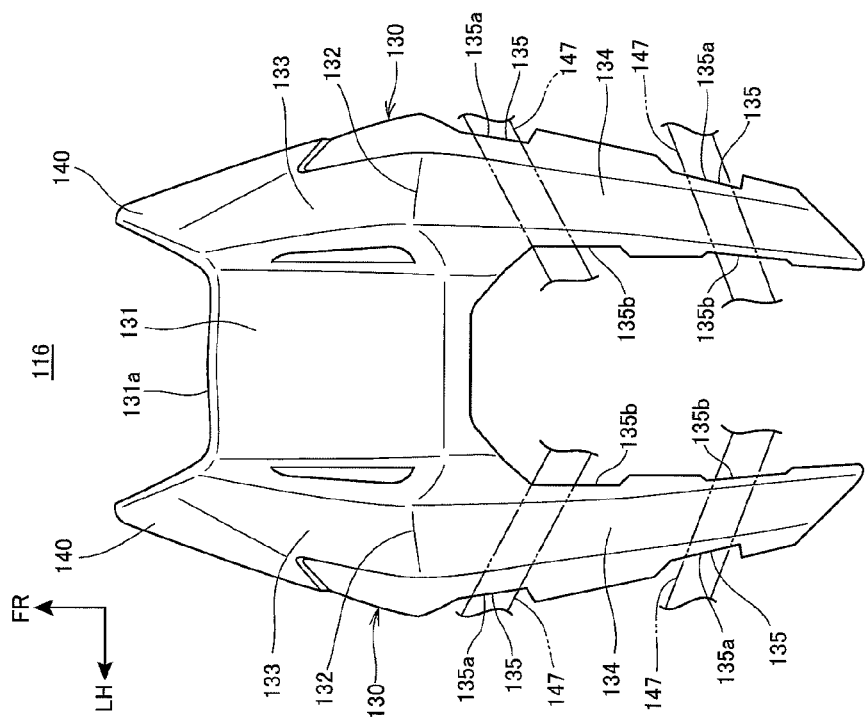
FIG. 7 is a plan view of the upper-side box lid.

FIG. 7 is a plan view of the upper-side box lid 116.

To explain the embodiment with reference to FIG. 2, and FIG. 4 to FIG. 7, the upper-side box lid 116 includes a pair of left and right longitudinally extending portions 130, 130 which extends in the longitudinal direction in a spaced-apart manner in the vehicle width direction; and a center connecting portion 131 (flat portion) which connects the longitudinally extending portions 130, 130 to each other in the vehicle width direction at a center position in the vehicle width direction. The longitudinally extending portions 130, 130 and the center connecting portion 131 are formed into an integral body by resin molding.

The upper-side box lid 116 includes bent portions 132, 132 where the upper-side box lid 116 is bent in the longitudinal direction at an approximately center position thereof in the longitudinal direction. Bent lines of the bent portions 132, 132 extend in the vehicle width direction. The upper-side box lid 116 is formed in an upwardly projecting manner as viewed in a side view by being bent at the bent portions 132, 132 so as to conform with a shape of the upper surface of the lid cover 118.

The longitudinally extending portions 130, 130 are respectively formed into a gutter shape bent in an upwardly projecting manner in cross section as viewed from a rear side in FIG. 5. The longitudinally extending portions 130, 130 respectively include, with each of the left and right bent portions 132, 132 set as a boundary: a front extending portion 133, 133 which extends to the front; and a rear extending portion 134, 134 which extends rearwardly. In the upper-side box lid 116, as viewed in a side view in FIG. 2, the bent portions 132 form apex portions, the front extending portions 133, 133 extend to the front in the frontward and downward direction from the bent portions 132, 132 respectively, and the rear extending portions 134, 134 extend rearwardly in the rearward and downward direction from the bent portions 132, 132 respectively.

The center connecting portion 131 which is formed into an approximately rectangular flat plate shape connects inner edges of the front extending portions 133, 133 to each other in the vehicle width direction. The center connecting portion 131 is arranged approximately horizontally behind the key cylinder 107. Thus, an article, for example, equipment such as a plate-like smart phone P (FIG. 4) can be placed on an upper surface of the center connecting portion 131.

The front extending portions 133, 133 include a pair of left and right arm portions 140, 140 which extends to the front from a front edge 131a of the center connecting portion 131. The arm portions 140, 140 have a tapered shape where a width is gradually decreased toward a front end side.

In the upper-side box lid 116, the longitudinally extending portions 130, 130 are connected to each other by the center connecting portion 131 at center portions thereof in the longitudinal direction, and the arm portions 140, 140 project to the front, and the rear extending portions 134, 134 project rearwardly. Accordingly, the upper-side box lid 116 has an approximately H shape as viewed in a plan view.

Each rear extending portion 134, 134 has upper recessed portions 135 (recessed portions) at positions where the rear extending portions 134, 134 overlap with the lower recessed portions 125 of the lid cover 118 respectively from above as viewed in a plan view. More specifically, the upper recessed portions 135 are formed on four portions corresponding to positions of the respective lower recessed portions 125. When the upper-side box lid 116 is viewed in a side view, the upper recessed portions 135 are formed by cutting out portions of lower edges of the rear extending portions 134, 134 upwardly, and penetrate the rear extending portions 134, 134 in the vehicle width direction respectively. Each upper recessed portion 135 is arranged in an inclined manner such that the upper recessed portion 135 is directed inwardly in the vehicle width direction and rearwardly with an outer end 135a of the upper recessed portion 135 in the vehicle width direction set as a proximal end as viewed in a plan view. More specifically, an inner end 135b of each upper recessed portion 135 in the vehicle width direction is positioned behind the outer end 135a of the upper recessed portion 135.

The upper-side box lid 116 is arranged such that the rear extending portions 134, 134 are positioned on left and right sides of the ridge portion 120 of the lid cover 118 respectively, and the upper-side box lid 116 is fixed by bolts 122 (FIG. 6). The rear extending portions 134, 134 are positioned outside the respective side recessed portions 123 of the lid cover 118 in the vehicle width direction. Accordingly, the respective side recessed portions 123 are exposed upwardly.

When the upper-side box lid 116 is mounted on the lid cover 118, the upper recessed portions 135 and the lower recessed portions 125 are combined with each other so that a plurality of bag mounting holes 136 which penetrate lower portions of the respective rear extending portions 134, 134 in the vehicle width direction are formed. In this embodiment, a pair of bag mounting holes 136 is formed in each rear extending portion 134 in the longitudinal direction of the vehicle. More specifically, the bag mounting hole 136 are formed in four portions in total. The bag mounting hole 136 is formed in an inclined manner such that the bag mounting hole 136 is directed inwardly in the vehicle width direction and rearwardly with an outer end thereof in the vehicle width direction set as a proximal end.

Further, when the upper-side box lid 116 is mounted on the lid cover 118, the front extending portion 119 (FIG. 6) of the lid base 117 is covered by a front portion of the upper-side box lid 116 from above.

As shown in FIG. 4, in a state where the box lid 52 is closed, the front edge 131a of the center connecting portion 131 of the upper-side box lid 116 is contiguously formed with an upper rear edge of the front top cover 110, and the arm portions 140, 140 are positioned on left and right sides of the key cylinder 107 respectively.

To be more specific, the arm portions 140, 140 are arranged at positions substantially equal to the position of the key cylinder 107 in the longitudinal direction of the vehicle, and are positioned outside the key cylinder 107 respectively in the vehicle width direction. More specifically, the arm portions 140, 140 are arranged so as to surround the key cylinder 107 from left and right sides.

In a state where the box lid 52 is closed, the arm portions 140, 140 cover an upper portion of the front top side cover 111 (FIG. 6).

An operator seated on the front seat 41 can easily and quickly open the box lid 52 in such a manner that the rider unlocks the box-side locking mechanism 102 by manually operating the key cylinder 107. Thereafter, the operator directly moves his/her hand sideward so as to grip at least either one of the arm portions 140, 140, and rotates the box lid 52 rearwardly while gripping the arm portion 140. The key cylinder 107 is arranged at the position where the rider can easily extend his hand to the key cylinder 107, and the side of the key cylinder 107 is also arranged at the position where the rider can easily extend his hand to the side in the same manner as the key cylinder 107. Thus, the rider can easily grip the arm portions 140, 140 and can perform opening and closing of the box lid 52.

Further, when the box-side locking mechanism 102 is unlocked, the box lid 52 slightly moves in the opening direction due to a biasing force of a spring (not shown in the drawing) mounted on the box lid 52, the box-side locking mechanism 102 or the like. Accordingly, a rider can easily grip the arm portions 140, 140.

As shown in FIG. 5, a bag 145 which can store an article therein may be mounted on the box lid 52. The bag 145 includes a box-shaped bag body 146 and a connecting member 147 which connects the bag body 146 to the box lid 52. In this embodiment, the connecting member 147 is formed of a left-and-right pair of strings disposed on a front portion of a lower portion of the bag body 146; and a left-and-right pair of strings disposed on a rear portion of the lower portion of the bag body 146. These strings are connected to each other by buckles, for example. However, a connection state of the connecting members 147 is not particularly limited.

The bag 145 is arranged on a rear portion of the upper-side box lid 116, and is connected to the rear extending portions 134, 134. To be more specific, the respective connecting members 147 are made to pass through the respective bag mounting holes 136 in the vehicle width direction, and are connected to the rear extending portions 134, 134 in a binding manner.

In this embodiment, the respective connecting members 147 are connected to the pair of left and right rear extending portions 134, 134 which are away from each other in the vehicle width direction. More specifically, it is possible to increase a distance between the positions where the bag 145 is connected so that the bag 145 can be firmly connected to the box lid 52.

Further, a space is formed between the left and right rear extending portions 134, 134. Thus, it is possible to make the upper-side box lid 116 lightweight. Even when the upper-side box lid 116 is made lightweight, the bag 145 can be firmly connected.

The rear extending portions 134, 134 extend rearwardly and downwardly. Thus, the bag 145 that has a large height can be mounted on the box lid 52 without becoming an obstacle to a rider. Thus, the capacity of the bag 145 can be increased. Since the bag 145 minimally becomes an obstacle, even in a state where the bag 145 is mounted on the box lid 52, the rider can grip the arm portions 140, 140 and can easily perform an opening and closing of the box lid 52.

A portion of a flow of air W (FIG. 6) from a front side which flows along the periphery of the box lid 52 enters the inside of the bag mounting holes 136 from outer ends of the respective bag mounting holes 136 in the vehicle width direction, and is discharged toward an upper side of the ridge portion 120 from inner ends of the respective bag mounting holes 136 in the vehicle width direction. More specifically, the respective bag mounting holes 136 are formed so as to allow a flow of air (wind) to flow toward the inside in the vehicle width direction from the outside in the vehicle width direction and rearwardly. Accordingly, even in the configuration where a height of the box lid 52 becomes high due to the provision of the upper-side box lid 116, the flow of air W can be made to efficiently flow rearwardly. Thus, the motorcycle 1 can ensure operational performance.

As has been explained heretofore, according to the embodiment to which the invention is applied, the motorcycle 1 includes the head pipe 14; the main frames 15, 15 which extends rearwardly from the head pipe 14; the storage box 51 which is arranged in the vicinity of the main frames 15, 15 in a state where the storage box 51 opens upwardly; and the box lid 52 which covers the opening portion 51a of the upwardly openable storage box 51 in an openable and closable manner, wherein the key cylinder 107 which operates the box-side locking mechanism 102 for locking the box lid 52 is arranged behind the handle holder 25 and in front of the storage box 51, and the box lid 52 includes the arm portions 140, 140 positioned on sides of the key cylinder 107. Due to such a configuration, a rider can operate the key cylinder 107 which is positioned behind the handle holder 25 and in front of the storage box 51 thus not being positioned excessively close to the occupant. Thus, the occupant can easily operate the key cylinder 107 and, at the same time, can easily perform an opening or closing operation of the box lid 52 by gripping the arm portions 140, 140 of the box lid 52 being arranged on sides of the key cylinder 107 and not being positioned excessively close to the rider. Accordingly, operability of the key cylinder 107 and operability of opening or closing of the box lid 52 can be enhanced with the simple structure.

The box lid 52 includes the lower-side box lid 115 and the upper-side box lid 116 for covering the lower-side box lid 115 from above, wherein the arm portions 140, 140 are formed on the upper-side box lid 116. Accordingly, the degree of freedom in setting the shape of the upper-side box lid 116 can be increased. Thus, the arm portions 140, 140 can be easily formed.

The upper recessed portions 135 and the lower recessed portions 125 are formed in the upper-side box lid 116 and the lower-side box lid 115 respectively thus forming the bag mounting holes 136. Accordingly, the bag 145 can be easily mounted on the box lid 52 without providing a dedicated part or the like for mounting the bag 145.

The bag mounting holes 136 are formed so as to allow a flow of air to flow toward the inside in the vehicle width direction from the outside in the vehicle width direction and rearwardly. Thus, even in the configuration where a height of the box lid 52 becomes high due to the provision of the upper-side box lid 116, it is possible to make the flow of air W efficiently flow rearwardly whereby the motorcycle 1 can ensure an operational performance.

The upper-side box lid 116 is formed into an approximately H-shape as viewed in a plan view by including a pair of left and right rear extending portions 134,134 which extends rearwardly, and the bag mounting hole 136 is formed on a side of the upper-side box lid 116 where the pair of left and right rear extending portions 134,134 is provided. With such a configuration, the bag 145 can be supported by the pair of left and right rear extending portions 134,134 provided to a rear portion of the upper-side box lid 116 having an approximately H shape at positions close to the outside in a vehicle width direction. Thus, the bag 145 can be supported firmly and, at the same time, the upper-side box lid 116 can be made lightweight.

The bent portions 132,132 where the upper-side box lid 116 is bent in a longitudinal direction of the vehicle 1 is formed on the upper-side box lid 116, the bag mounting holes 136 are formed in the upper-side box lid 116 behind the bent portions 132, 132, and the arm portions 140, 140 are formed on the upper-side box lid 116 in front of the bent portions 132, 132. Accordingly, the external appearance of the upper-side box lid 116 at the time of not mounting the bag 145 can be enhanced by the bent portions 132, 132, and the bag 145 can ensure a large capacity when the bag 145 is mounted. Further, a distance can be ensured between the bag 145 and the arm portions 140, 140. Thus, the bag 145 minimally becomes an obstacle whereby the operability of the arm portions 140, 140 can be enhanced.

Further, the bent portions 132, 132 where the upper-side box lid 116 is bent in a longitudinal direction of the vehicle 1 is formed on the upper-side box lid 116, and the upper-side box lid 116 has the center connecting portion 131 which is formed approximately flat at the center in a vehicle width direction at a position in front of the bent portions 132, 132 and behind the key cylinder 107. Accordingly, the smartphone P or the like can be arranged on the center connecting portion 131 formed approximately flat at the center in the vehicle width direction.

The above-mentioned embodiment merely shows one mode to which the invention is applied, and the invention is not limited to the above-mentioned embodiment.

An explanation has been made with respect to the case where the bag mounting holes 136 are formed by forming the upper recessed portions 135 and the lower recessed portions 125 on the upper-side box lid 116 and the lower-side box lid 115 respectively. However, the invention is not limited to such a configuration. The bag mounting holes may be formed by forming recessed portions on at least one of the upper-side box lid 116 and the lower-side box lid 115.

An explanation has been made with respect to the case where the pair of arm portions 140, 140 is arranged so as to surround the key cylinder 107 from left and right sides. However, the invention is not limited to such a configuration, and the arm portion 140 may be formed only either on a left side or on a right side.

In the above embodiment, the storage part 50 is disposed above the rear portions of the main frames 15, 15. However, the invention is not limited to such a configuration, and the storage part 50 may be disposed between the left and right main frames 15, 15 or above a main frame when the main frame is formed of a single frame.

A motorcycle is used as an example of a saddle-ride-type vehicle. However, the saddle-ride-type vehicle may be a vehicle having three or more wheels, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A storage part structure of a saddle-ride vehicle comprising:
   a head pipe;
   a main frame extending rearwardly from the head pipe;
   a storage box arranged adjacent to the main frame
      wherein the storage box opens upwardly; and a box lid for covering an opening portion of the upwardly openable storage box in an openable and closable manner;
wherein a key cylinder for operating a box-side locking mechanism for locking the box lid is arranged behind a handle holder and in front of the storage box; and
the box lid includes:
an arm portion positioned on a side of the key cylinder;
a lower-side box lid; and
an upper-side box lid for covering the lower-side box lid from above; wherein the arm portion is formed on the upper-side box lid.

2. The storage part structure of a saddle-ride vehicle according to claim 1, wherein a recessed portion is formed in at least one of the upper-side box lid and the lower-side box lid thus forming a bag mounting hole.

3. The storage part structure of a saddle-ride vehicle according to claim 2, wherein the bag mounting hole is formed so as to allow air to flow toward an inside in a vehicle width direction from an outside in a vehicle width direction and rearwardly.

4. The storage part structure of a saddle-ride vehicle according to claim 2, wherein the upper-side box lid is formed into an approximately H-shape as viewed in a plan view by including a pair of left and right rear extending portions extending rearwardly, and the bag mounting hole is formed on a side of the upper-side box lid where the pair of left and right rear extending portions is provided.

5. The storage part structure of a saddle-ride vehicle according to claim 3, wherein the upper-side box lid is formed into an approximately H-shape as viewed in a plan view by including a pair of left and right rear extending portions extending rearwardly, and the bag mounting hole is formed on a side of the upper-side box lid where the pair of left and right rear extending portions is provided.

6. The storage part structure of a saddle-ride vehicle according to claim 1, wherein a bent portion where the upper-side box lid is bent in a longitudinal direction of the vehicle is formed on the upper-side box lid, the bag mounting hole is formed in the upper-side box lid behind the bent portion, and the arm portion is formed on the upper-side box lid in front of the bent portion.

7. The storage part structure of a saddle-ride vehicle according to claim 2, wherein a bent portion where the upper-side box lid is bent in a longitudinal direction of the vehicle is formed on the upper-side box lid, the bag mounting hole is formed in the upper-side box lid behind the bent portion, and the arm portion is formed on the upper-side box lid in front of the bent portion.

8. The storage part structure of a saddle-ride vehicle according to claim 3, wherein a bent portion where the upper-side box lid is bent in a longitudinal direction of the vehicle is formed on the upper-side box lid, the bag mounting hole is formed in the upper-side box lid behind the bent portion, and the arm portion is formed on the upper-side box lid in front of the bent portion.

9. The storage part structure of a saddle-ride vehicle according to claim 4, wherein a bent portion where the upper-side box lid is bent in a longitudinal direction of the vehicle is formed on the upper-side box lid, the bag mounting hole is formed in the upper-side box lid behind the bent portion, and the arm portion is formed on the upper-side box lid in front of the bent portion.

10. The storage part structure of a saddle-ride vehicle according to claim 1, wherein a bent portion where the upper-side box lid is bent in a longitudinal direction of the vehicle is formed on the upper-side box lid, and the upper-side box lid has a flat portion formed approximately flat at the center in a vehicle width direction at a position in front of the bent portion and behind the key cylinder.

11. The storage part structure of a saddle-ride vehicle according to claim 2, wherein a bent portion where the upper-side box lid is bent in a longitudinal direction of the vehicle is formed on the upper-side box lid, and the upper-side box lid has a flat portion formed approximately flat at the center in a vehicle width direction at a position in front of the bent portion and behind the key cylinder.

12. The storage part structure of a saddle-ride vehicle according to claim 3, wherein a bent portion where the upper-side box lid is bent in a longitudinal direction of the vehicle is formed on the upper-side box lid, and the upper-side box lid has a flat portion formed approximately flat at the center in a vehicle width direction at a position in front of the bent portion and behind the key cylinder.

13. The storage part structure of a saddle-ride vehicle according to claim 4, wherein a bent portion where the upper-side box lid is bent in a longitudinal direction of the vehicle is formed on the upper-side box lid, and the upper-side box lid has a flat portion formed approximately flat at the center in a vehicle width direction at a position in front of the bent portion and behind the key cylinder.

14. A storage part structure of a saddle-ride vehicle comprising:
a head pipe;
a main frame extending rearwardly from the head pipe;
a storage box operatively connected to the main frame wherein the storage box opens upwardly; and
a storage box lid for covering an opening portion of the upwardly openable storage box in an openable and closable manner;
a box-side locking mechanism for locking the storage box lid;
a key cylinder for operating the box-side locking mechanism for locking and unlocking the box lid, said key cylinder being arranged behind a handle holder and in front of the storage box; and
the storage box lid includes:
an arm portion positioned on a side of the key cylinder;
a lower-side box lid; and
an upper-side box lid for covering the lower-side box lid from above; wherein the arm portion is formed on the upper-side box lid.

15. The storage part structure of a saddle-ride vehicle according to claim 14, wherein a recessed portion is formed in at least one of the upper-side box lid and the lower-side box lid thus forming a bag mounting hole.

16. The storage part structure of a saddle-ride vehicle according to claim 14, wherein the bag mounting hole is formed for allowing air to flow toward an inside in a vehicle width direction from an outside in a vehicle width direction and rearwardly.

17. The storage part structure of a saddle-ride vehicle according to claim 16, wherein the upper-side box lid is formed into an approximately H-shape as viewed in a plan view by including a pair of left and right rear extending portions extending rearwardly, and the bag mounting hole is formed on a side of the upper-side box lid where the pair of left and right rear extending portions is provided.

18. The storage part structure of a saddle-ride vehicle according to claim 14, wherein the upper-side box lid is formed into an approximately H-shape as viewed in a plan view by including a pair of left and right rear extending portions extending rearwardly, and the bag mounting hole is formed on a side of the upper-side box lid where the pair of left and right rear extending portions is provided.

\* \* \* \* \*